US012300922B2

(12) United States Patent
Kobuchi et al.

(10) Patent No.: US 12,300,922 B2
(45) Date of Patent: May 13, 2025

(54) CONNECTOR WITH A REINFORCING MEMBER

(71) Applicant: Japan Aviation Electronics Industry, Limited, Tokyo (JP)

(72) Inventors: Toshiro Kobuchi, Tokyo (JP); Atsushi Kobayashi, Tokyo (JP); Takuya Takahashi, Tokyo (JP); Takayuki Nishimura, Tokyo (JP)

(73) Assignee: JAPAN AVIATION ELECTRONICS INDUSTRY, LIMITED, Tokyo (JP)

(*) Notice: Subject to any disclaimer, the term of this patent is extended or adjusted under 35 U.S.C. 154(b) by 408 days.

(21) Appl. No.: 17/978,457

(22) Filed: Nov. 1, 2022

(65) Prior Publication Data

US 2023/0198185 A1 Jun. 22, 2023

(30) Foreign Application Priority Data

Dec. 22, 2021 (JP) ................................ 2021-207954

(51) Int. Cl.
*H01R 13/115* (2006.01)
*H01R 13/187* (2006.01)

(52) U.S. Cl.
CPC ......... *H01R 13/115* (2013.01); *H01R 13/187* (2013.01)

(58) Field of Classification Search
CPC ............................ H01R 13/115; H01R 13/187
USPC .................................................... 439/816, 66
See application file for complete search history.

(56) References Cited

U.S. PATENT DOCUMENTS

| | | | | |
|---|---|---|---|---|
| 9,325,103 B2 * | 4/2016 | Arai | .................. | H01R 13/5219 |
| 9,391,398 B2 * | 7/2016 | Omodachi | ........... | H01R 12/707 |
| 9,397,423 B2 * | 7/2016 | Suzuki | ................. | H01R 12/716 |
| 9,899,771 B2 * | 2/2018 | Ashibu | .................. | H01R 13/50 |
| 9,997,852 B2 * | 6/2018 | Chen | .................. | H01R 12/7082 |
| 10,651,579 B2 * | 5/2020 | Ono | ..................... | H01R 13/504 |
| 2014/0120780 A1 | 5/2014 | Nishimura et al. | | |
| 2014/0256195 A1 | 9/2014 | Obikane et al. | | |

(Continued)

FOREIGN PATENT DOCUMENTS

| | | |
|---|---|---|
| JP | 201493292 A | 5/2014 |
| KR | 20140109226 A | 9/2014 |

(Continued)

*Primary Examiner* — Harshad C Patel
(74) *Attorney, Agent, or Firm* — Muncy, Geissler, Olds & Lowe, P.C.

(57) ABSTRACT

A connector includes a housing extending in a predetermined direction intersecting the fitting direction, a plurality of contacts held by the housing and arrayed along the predetermined direction, and a reinforcing member held at an end portion of the housing in the predetermined direction and made of a metal material, the reinforcing member having a first member and a second member, the first member including a first reinforcing portion extending in a U-shape along the end portion of the housing when viewed in the fitting direction, and a connecting portion connected to the first reinforcing portion and electrically connected to a counter reinforcing member of the counter connector, the second member being formed as a separate component from the first member and including a second reinforcing member extending in a U-shape along the first reinforcing portion when viewed in the fitting direction.

9 Claims, 9 Drawing Sheets

(56) References Cited

U.S. PATENT DOCUMENTS

| | | | | |
|---|---|---|---|---|
| 2019/0181572 | A1* | 6/2019 | Ono | H01R 12/716 |
| 2019/0363467 | A1 | 11/2019 | Ko et al. | |

FOREIGN PATENT DOCUMENTS

| | | | |
|---|---|---|---|
| KR | 10-2015-0075029 | A | 7/2015 |
| KR | 102041368 | B1 | 11/2019 |

* cited by examiner

CONNECTOR WITH A REINFORCING MEMBER

BACKGROUND OF THE INVENTION

The present invention relates to a connector, in particular, to a connector in which a reinforcing member is attached to a housing.

Conventionally, there has been known a connector in which a reinforcing member is attached to a housing holding a contact. The reinforcing member is made of, for example, a metal material and reinforces a connector at the time of fitting with a counter connector.

For example, JP 2014-93292 A discloses a connector in which a plurality of contacts 2 are held to be arrayed in a housing 1 made of a resin material as shown in FIG. 18. A reinforcing member 3 made of a metal material is attached to each of opposite end portions of the housing 1 along a direction in which the plurality of contacts 2 are arrayed.

The housing 1 includes a pair of wall portions 1A facing each other, a center protruding portion 1B disposed between the pair of wall portions 1A, a joint portion 1C joining end portions of the pair of wall portions 1A to each other, and a bottom portion 1D, and the contacts 2 are disposed between each of the wall portions 1A and the center protruding portion 1B. Around the center protruding portion 1B, an accommodating portion 1E of recess shape for accommodating a counter connector (not shown) is formed by the pair of wall portions 1A, the joint portion 1C, and the bottom portion 1D.

A bent portion 3A is formed at an end portion of each reinforcing member 3 and press-fitted into a groove 1F formed in the joint portion 1C of the housing 1, whereby the reinforcing members 3 are attached to the housing 1.

While the above-mentioned reinforcing member 3 reinforces the connector, in order to further improve a reinforcement strength of the connector, an increase in sheet thickness of the reinforcing member 3 is effective.

However, when the sheet thickness of the reinforcing member 3 increases, for example, a bending radius in bending a metal sheet which is a material for forming the reinforcing member 3 increases, resulting in a larger connector.

In particular, in a small-sized connector, saving a space therefor is important, and failure of size reduction due to improvement in reinforcement strength is not allowed in many cases.

SUMMARY OF THE INVENTION

The present invention has been made to overcome such a conventional problem and is aimed at providing a connector which can improve a reinforcement strength thereof without failure of size reduction.

A connector according to the present invention is one fitted to a counter connector along a fitting direction, the connector comprising:

a housing extending in a predetermined direction intersecting the fitting direction;

a plurality of contacts held by the housing and arrayed along the predetermined direction; and a reinforcing member held at an end portion of the housing in the predetermined direction and made of a metal material, wherein the reinforcing member includes:

a first member including a first reinforcing portion extending in a U-shape along the end portion of the housing when viewed in the fitting direction, and a connecting portion connected to the first reinforcing portion and electrically connected to a counter reinforcing member of the counter connector in fitting with the counter connector, and a second member formed as a separate component from the first member and including a second reinforcing member extending in a U-shape along the first reinforcing portion when viewed in the fitting direction.

DETAILED DESCRIPTION OF THE INVENTION

An embodiment of the present invention is described below with reference to the accompanying drawings.

Figure 1:
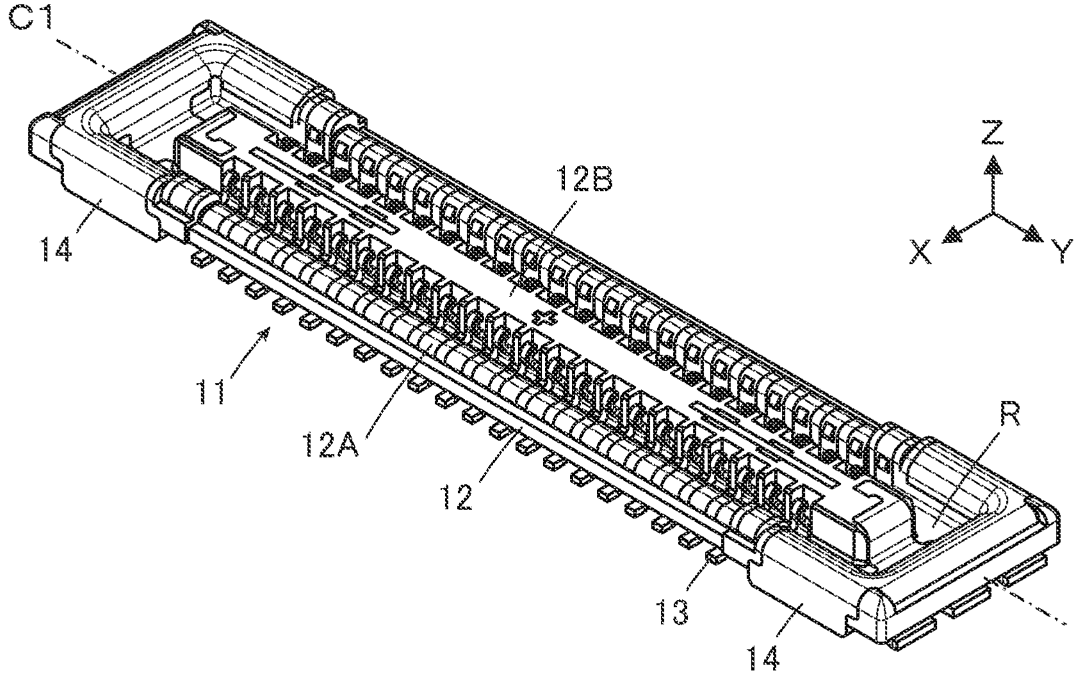
FIG. 1 is a perspective view showing a connector according to an embodiment of the present invention.

FIG. 1 shows a perspective view of a connector 11 according to the embodiment. The connector 11 is a receptacle connector taking a plug connector to be described later as a counter connector, and has a substantially rectangular flat plate shape extending along a central axis C1. The connector 11 includes a housing 12 extending along the central axis C1, a plurality of contacts 13 held by the housing 12, and a pair of reinforcing members 14 separately attached to opposite end portions, in a direction along the central axis C1, of the housing 12.

For convenience, the direction in which the central axis C1 extends is called "Y direction," the plane in which the connector 11 of flat plate shape extends "XY plane," and the direction orthogonal to an XY plane "Z direction."

Figure 2:
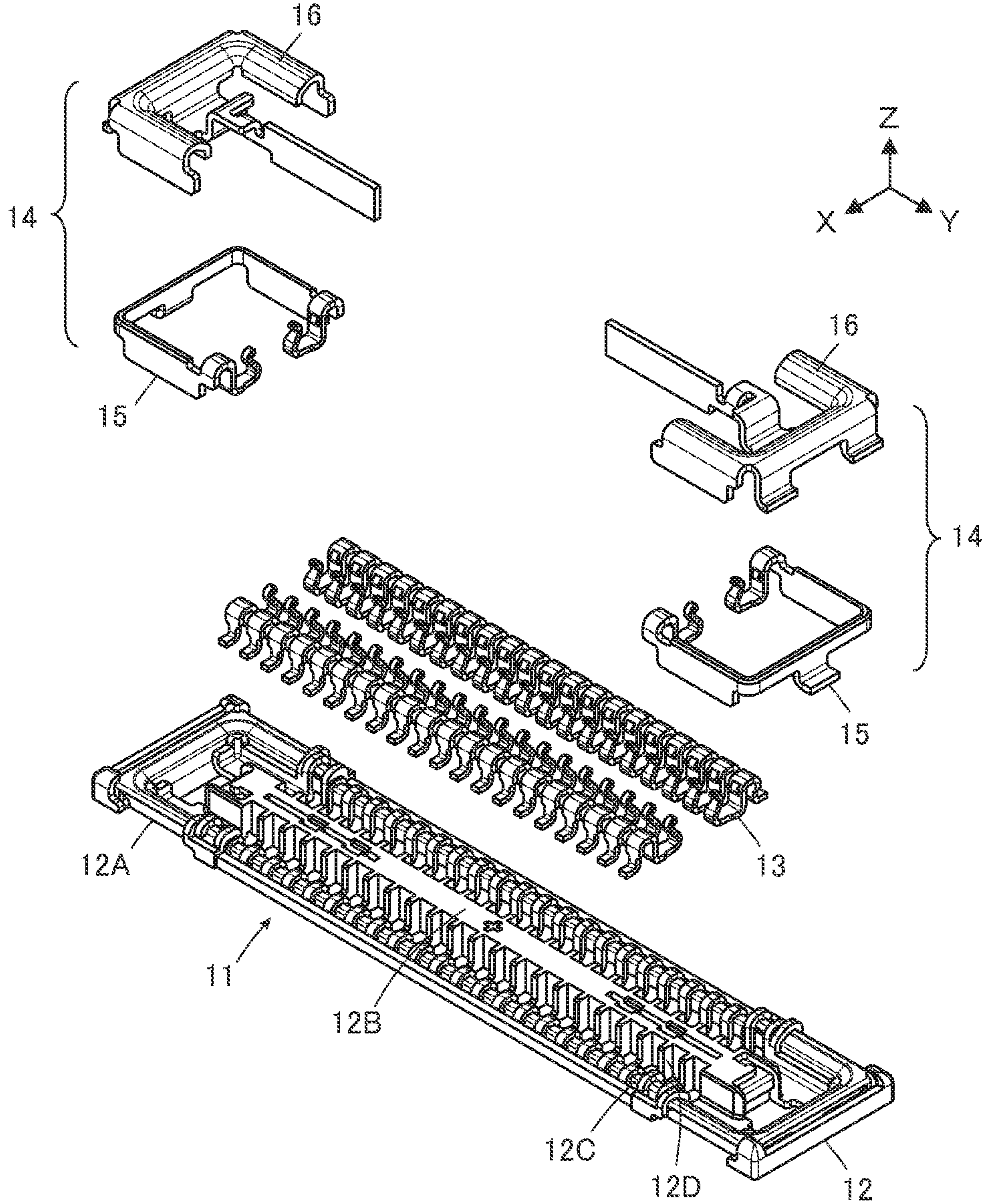
FIG. 2 is an exploded perspective view showing the connector according to the embodiment when viewed from an obliquely upper position.
Figure 3:
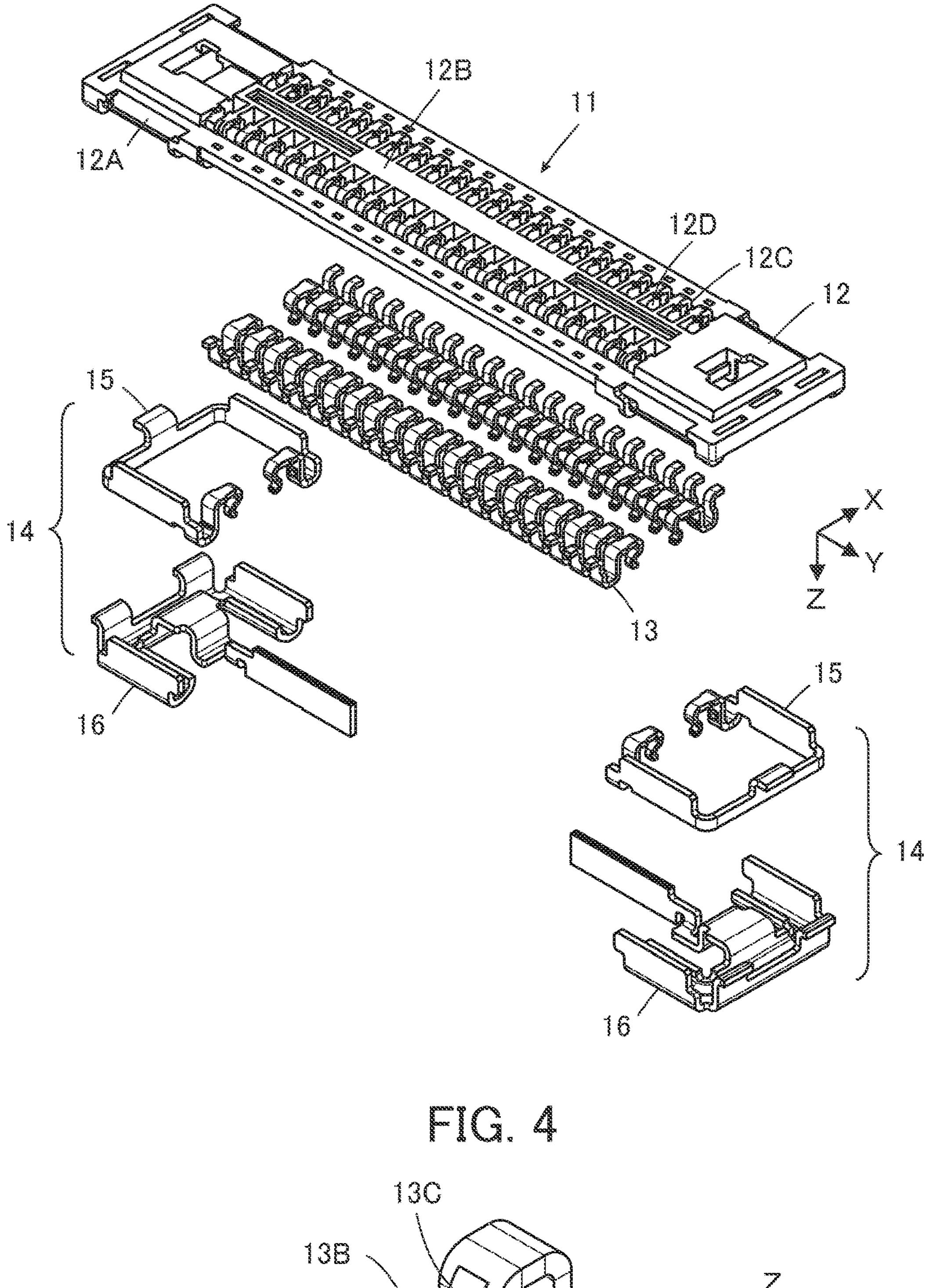
FIG. 3 is an exploded perspective view showing the connector according to the embodiment when viewed from an obliquely lower position.

FIGS. 2 and 3 show exploded perspective views of the connector 11.

The housing 12 is made of a resin material having insulating properties and includes an outer wall portion 12A of rectangular frame shape formed so as to surround the periphery of the connector 11, and a fitting portion 12B of substantially cuboid shape extending in the Y direction inside the outer wall portion 12A. The outer wall portion 12A and the fitting portion 12B project in the +Z direction.

A plurality of contact accommodating grooves 12C are formed to be arrayed in the outer wall portion 12A, and similarly, a plurality of contact accommodating grooves 12D separately corresponding to the plurality of contact accommodating grooves 12C of the outer wall portion 12A are formed to be arrayed in the fitting portion 12B. The contact accommodating groove 12C of the outer wall portion 12A and the contact accommodating groove 12D of the fitting portion 12B, which correspond to each other, are situated in the same Y directional position.

The plurality of contacts 13 are arrayed in two lines along the Y direction, each made of a metal material having conductivity, and accommodated in the plurality of contact accommodating grooves 12C and the plurality of contact accommodating grooves 12D of the housing 12. Each of the contacts 13 is disposed so as to extend in the X direction from the outer wall portion 12A to reach the fitting portion 12B of the housing 12.

The pair of reinforcing members 14 are each constituted of a first member 15 and a second member 16 formed as a separate component from the first member 15. The first member 15 and the second member 16 are each made of a metal material having conductivity and held by the housing 12 made of a resin material.

Figure 4:
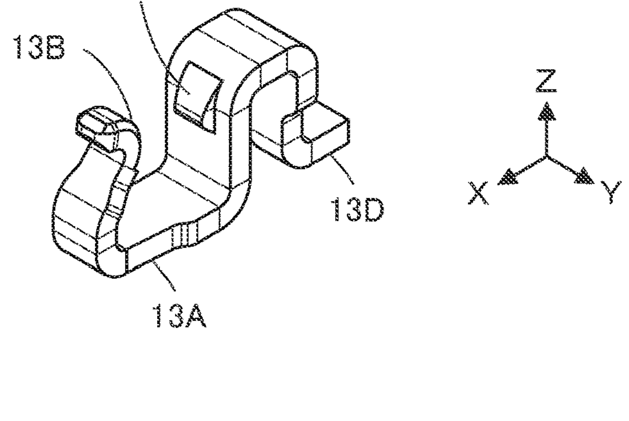
FIG. 4 is a perspective view showing a contact used in the embodiment.

FIG. 4 shows a contact 13 disposed on the −X direction side, of the plurality of contacts 13 arrayed in two lines along the Y direction. The contact 13 is formed of a single bent metal sheet and includes an arm portion 13A bent in a U-shape opening in the +Z direction, and a pair of spring contact points 13B and 13C facing each other in the X direction are formed at a U-shaped bent portion of the arm portion 13A. In addition, a mounting portion 13D facing in the −Z direction is formed at a −X directional end portion of the arm portion 13A.

Of the plurality of contacts 13 arrayed in two lines, contacts 13 disposed on the +X direction side are arranged symmetrically to contacts 13 on the −X direction side about a YZ plane, but have the same configuration as that of the contacts 13 on the −X direction side.

Figure 5:
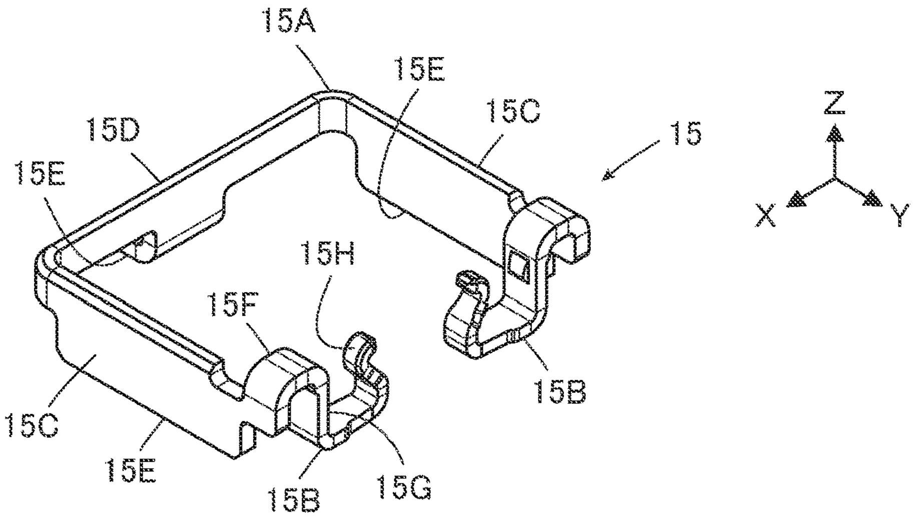
FIG. 5 is a perspective view showing a first member used in the embodiment when viewed from an obliquely upper position.
Figure 6:
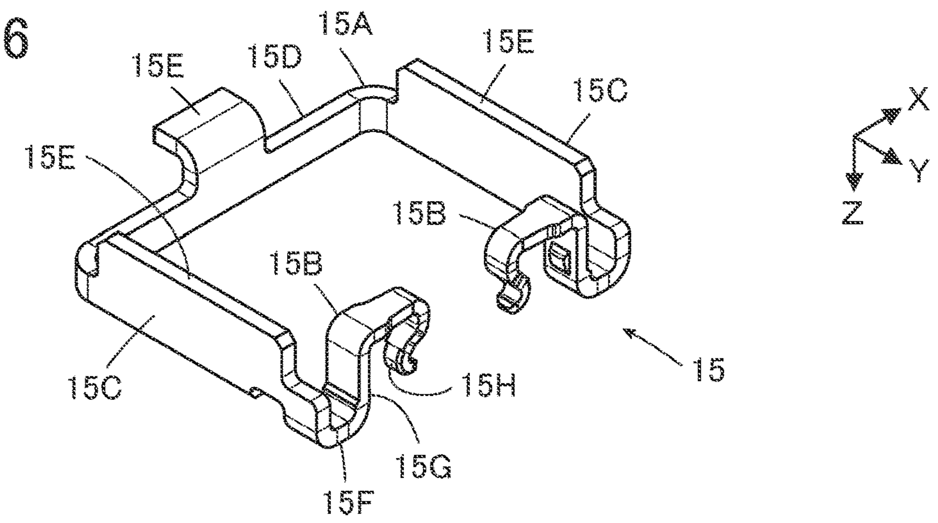
FIG. 6 is a perspective view showing the first member used in the embodiment when viewed from an obliquely lower position.

FIGS. 5 and 6 show a first member 15 of a reinforcing member 14 disposed on a −Y directional end portion of the housing 12, of the pair of reinforcing members 14. The first member 15 is formed of a single bent metal sheet and includes a first reinforcing portion 15A extending in a U-shape along the −Y directional end portion of the housing 12, and a pair of connecting portions 15B separately connected to opposite ends of the U-shaped first reinforcing portion 15A.

The first reinforcing portion 15A is formed by bending, in a U-shape in an XY plane, a metal sheet of band shape having a width direction along the Z direction. The first reinforcing portion 15A includes a pair of first side portions 15C each having a sheet thickness direction directed to the X direction and extending along a YZ plane so as to face each other with a gap therebetween in the X direction, and a first abutment portion 15D having a sheet thickness direction directed to the Y direction and extending along an XZ plane so as to join −Y directional end portions of the pair of first side portions 15C to each other.

In addition, −Z directional end portions of the pair of first side portions 15C and a −Z directional end portion of the first abutment portion 15D are each provided with a mounting portion 15E.

Of the pair of connecting portions 15B, a connecting portion 15B situated on the +X direction side includes an arm portion 15F extending in the −X direction from a +Y directional end portion of the corresponding first side portion 15C and, at the same time, bent in a U-shape opening in the +Z direction. A pair of spring contact points 15G and 15H facing each other in the X direction are formed at a U-shaped bent portion of the arm portion 15F.

Of the pair of connecting portions 15B, a connecting portion 15B disposed on the −X direction side is disposed symmetrically to the connecting portion 15B on the +X direction side about a YZ plane but has the same configuration as that of the connecting portion 15B on the +X direction side.

Figure 7:
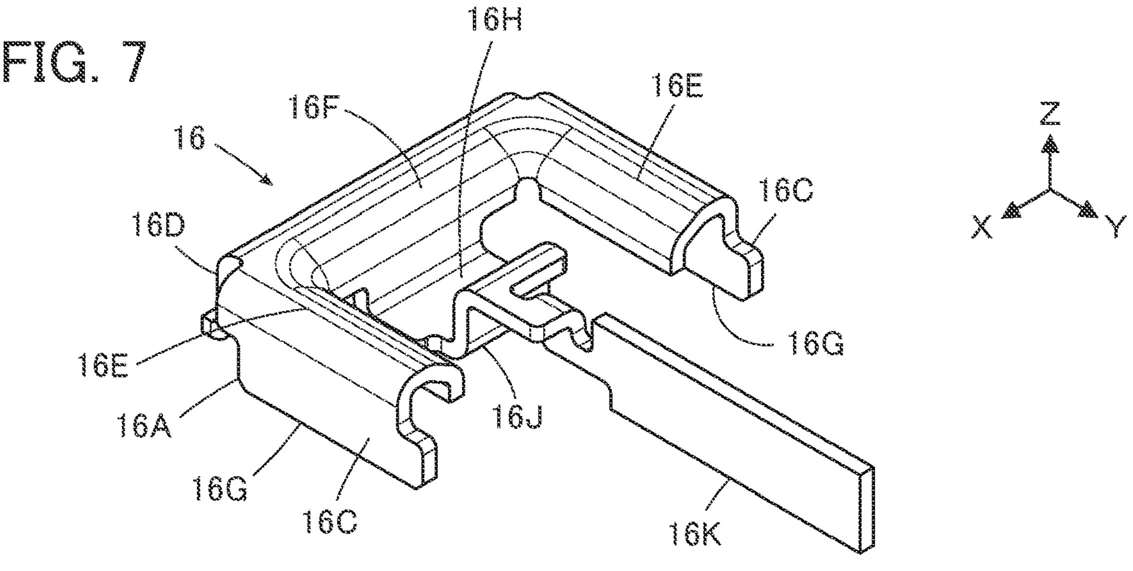
FIG. 7 is a perspective view showing a second member used in the embodiment when viewed from an obliquely upper position.
Figure 8:
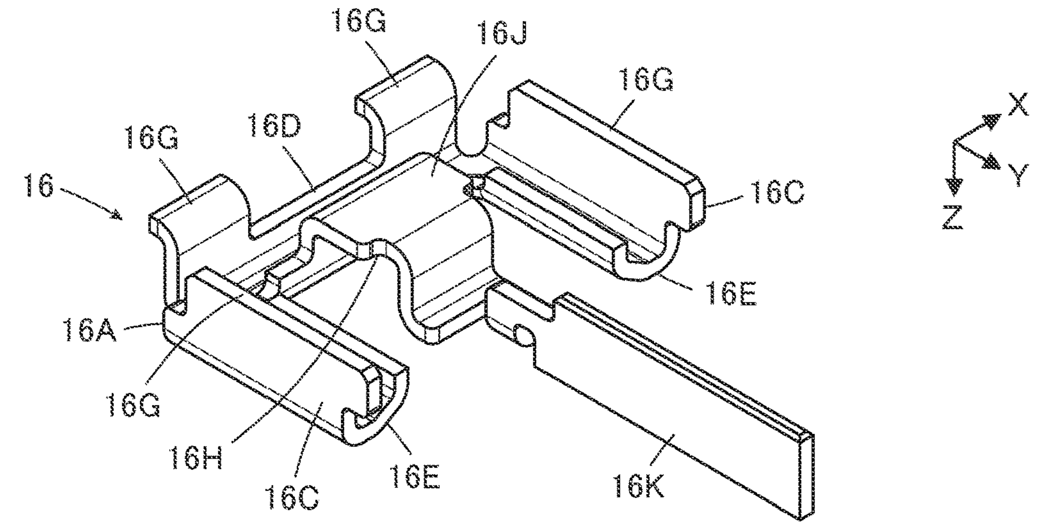
FIG. 8 is a perspective view showing the second member used in the embodiment when viewed from an obliquely lower position.

FIGS. 7 and 8 show a second member 16 of the reinforcing member 14 disposed at the −Y directional end portion of the housing 12, of the pair of reinforcing members 14. The second member 16 is formed of a single bent metal sheet and includes a second reinforcing portion 16A extending in a U-shape along the −Y directional end portion of the housing 12.

The second reinforcing member 16A includes a pair of second side portions 16C each having a sheet thickness direction directed to the X direction and extending along a YZ plane so as to face each other with a gap therebetween in the X direction, and a second abutment portion 16D having a sheet thickness direction directed to the Y direction and extending along an XZ plane between −Y directional end portions of the pair of second side portions 16C. The pair of second side portions 16C and the second abutment portion 16D are each formed of a metal sheet of band shape having a width direction along the Z direction and are spaced apart from one another without being joined to one another.

A pair of cover portions 16E extending in the X direction to approach each other and each having a cross-sectional shape curved in a U-shape opening in the −Z direction are separately joined to +Z directional end portions of the pair of second side portions 16C, and a cover portion 16F extending in the +Y direction and having a cross-sectional shape curved in a U-shape opening in the −Z direction is joined to a +Z directional end portion of the second abutment portion 16D. A +X directional end portion and a −X directional end portion of the cover portion 16F are separately joined to −Y directional end portions of the pair of cover portions 16E.

In addition, −Z directional end portions of the pair of second side portions 16C and a −Z directional end portion of the second abutment portion 16D are each provided with a mounting portion 16G.

Further, a bottom portion 16J extending in the +Y direction and forming a recessed portion 16H opening in the +Z direction is joined to a +Y directional end portion of the cover portion 16F, and further, a rib portion 16K having a sheet thickness direction directed to the X direction and extending in the +Y direction is joined to a +Y directional end portion of the bottom portion 16J. The rib portion 16K is to be embedded in the fitting portion 12B of the housing 12 made of a resin material.

A first member 15 and a second member 16 of a reinforcing member 14 disposed at a +Y directional end portion of the housing 12, of the pair of reinforcing members 14 are disposed symmetrical, about an XZ plane, to the first member 15 and the second member 16 of the reinforcing member 14 on the −Y directional end portion side of the housing 12 as shown in FIGS. 5 to 8, but have the same configuration as that of the first member 15 and the second member 16 of the reinforcing member 14 on the −Y directional end portion side of the housing 12.

The housing 12 in which the first members 15 and the second members 16 of the pair of reinforcing members 14 are integrated can be produced by integrally molding a resin in a state where the first members 15 and the second members 16 of the pair of reinforcing members 14 are held in a mold (not shown), i.e., by so-called insert molding. Thereafter, the plurality of contacts 13 are separately press-fitted into the plurality of contact accommodating grooves 12C formed in the outer wall portion 12A of the housing 12, whereby the connector 11 shown in FIG. 1 is produced. Note that the plurality of contacts 13 may be, together with the first members 15 and the second members 16 of the pair of reinforcing members 14, integrally held in the housing 12 by insert molding.

As shown in FIG. 1, around the fitting portion 12B of the housing 12, a counter connector accommodating portion R of recess shape opening in the +Z direction is formed to surround the fitting portion 12B.

Figure 9:
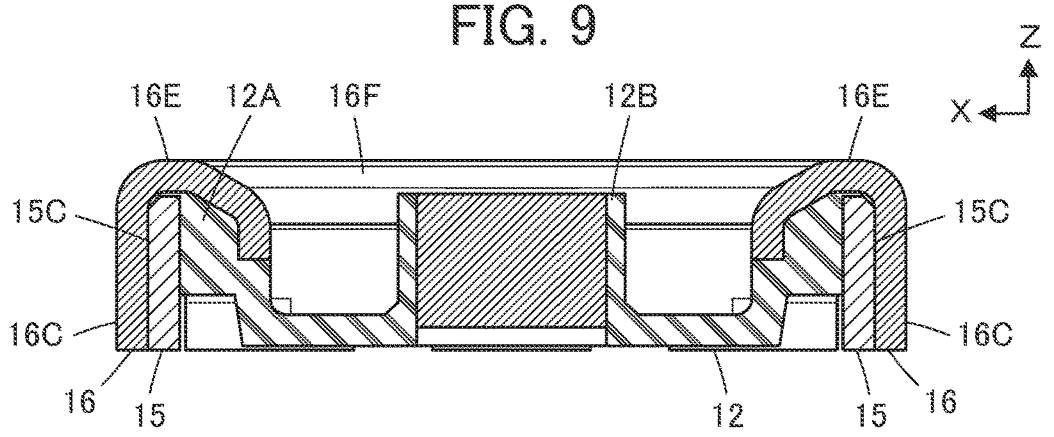
FIG. 9 is a cross-sectional view passing through a reinforcing member of the connector according to the embodiment.

FIG. 9 shows a cross-sectional view obtained by cutting, along an XZ plane, the reinforcing member 14 integrated with the housing 12 by integral molding. The first side portion 15C of the first member 15 is disposed to overlap the inside of the second side portion 16C of the second member 16, and the cover portion 16E joined to the +Z directional end portion of the second side portion 16C of the second member 16 covers a +Z directional end portion of the first side portion 15C. Although not shown, the first abutment portion 15D of the first member 15 and the second abutment portion 16D of the second member 16 are also disposed to overlap each other, and the cover portion 16F joined to the +Z directional end portion of the second abutment portion 16D covers a +Z directional end portion of the first abutment portion 15D.

With this configuration, the U-shaped first reinforcing portion 15A of the first member 15 having the pair of first side portions 15C and the first abutment portion 15D and the U-shaped second reinforcing portion 16A of the second member 16 having the pair of second side portions 16C and the second abutment portion 16D are held by the housing 12, thereby reinforcing the connector 11.

While a reinforcement strength of the connector 11 by the reinforcing member 14 varies depending on the sheet thickness of the metal sheet forming the reinforcing member 14, since the reinforcing member 14 is constituted of two components, i.e., the first member 15 and the second member 16, and the first reinforcing portion 15A of U-shape of the first member 15 and the second reinforcing portion 16A of U-shape of the second member 16 overlap each other, the connector 11 has a reinforcement strength corresponding to a sum of the sheet thickness of the metal sheet forming the first member 15 and the sheet thickness of the metal sheet forming the second member 16.

If, instead of the reinforcing member 14 constituted of two components, i.e., the first member 15 and the second member 16, a reinforcing member is formed of a single metal sheet having a sheet thickness corresponding to the sum of the sheet thickness of the metal sheet forming the first member 15 and the sheet thickness of the metal sheet forming the second member 16, a reinforcement strength equivalent to that of the reinforcing member 14 can be obtained. However, as a sheet thickness increases, a bending radius becomes large when a metal sheet is subjected to bending process by, for example, drawing or press working, and consequently, a size of a reinforcing member becomes large, causing a problem that a size of a connector having the reinforcing member increases.

Since in the connector 11 according to the embodiment, the reinforcing member 14 is formed of two components, i.e., the first member 15 and the second member 16, the reinforcement strength can be ensured without increasing the bending radius.

For example, the connector 11 is disposed on a first substrate (not shown), the mounting portions 13D of the plurality of contacts 13 are separately solder-mounted on a plurality of connecting pads of the first substrate, and the plurality of mounting portions 15E of the first member 15 and the plurality of mounting members 16G of the second member 16 of each of the pair of reinforcing members 14 are solder-mounted on a power source pad of the first substrate, whereby the connector 11 can be mounted on the first substrate.

At this time, by mounting the plurality of mounting portions 15E of the first member 15 and the plurality of mounting portions 16G of the second member 16 of each of the reinforcing members 14 on the common power source pad of the first substrate, the first member 15 and the second member 16 constituting the reinforcing member 14 are electrically connected with each other via the common power source pad of the first substrate.

Figure 10:
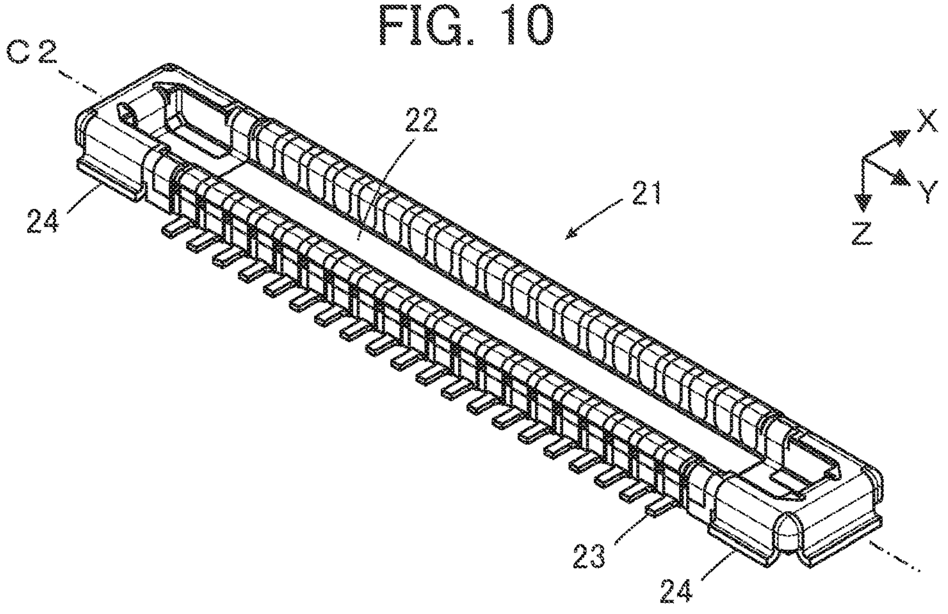
FIG. 10 is a perspective view showing a counter connector.

Here, FIG. 10 shows a counter connector 21 to be fitted with the connector 11. The counter connector 21 is a plug connector and has a substantially rectangular flat plate shape extending along a central axis C2. The counter connector 21 includes a housing 22 extending along the central axis C2, a plurality of contacts 23 held by the housing 22, and a pair of reinforcing members (counter reinforcing members) 24 separately attached to opposite end portions, in a direction along the central axis C2, of the housing 22.

Figure 11:
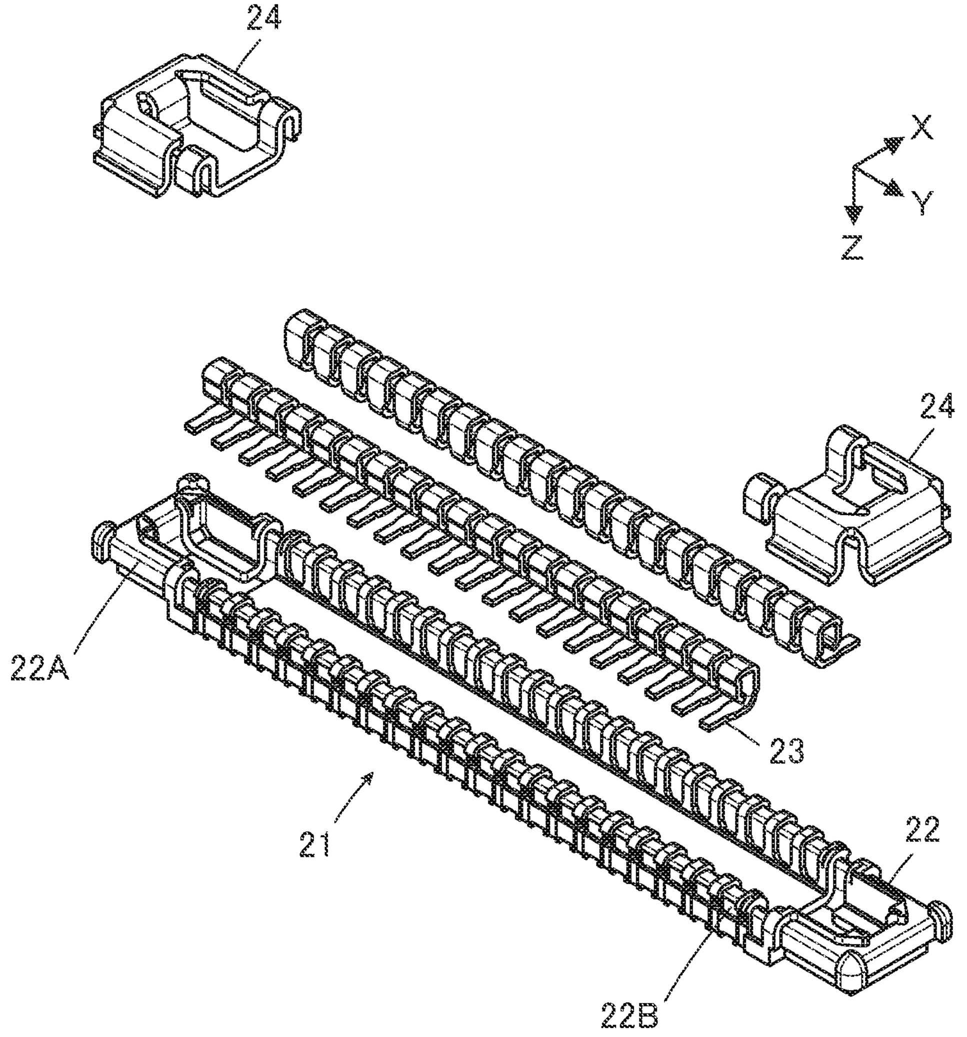
FIG. 11 is an exploded perspective view of the counter connector.

FIG. 11 shows an exploded perspective view of the counter connector 21.

The housing 22 is made of a resin material having insulating properties and includes an outer wall portion 22A of rectangular frame shape formed so as to surround the periphery of the counter connector 21 and projecting in the −Z direction. A plurality of contact accommodating grooves 22B are formed to be arrayed in the outer wall portion 22A.

The plurality of contacts 23 are arrayed in two lines along the Y direction, each made of a metal material having conductivity and separately accommodated in the plurality of contact accommodating grooves 22B of the housing 22.

In addition, the pair of reinforcing members 24 are each made of a metal material having conductivity and held by the housing 22 made of a resin material.

Figure 12:
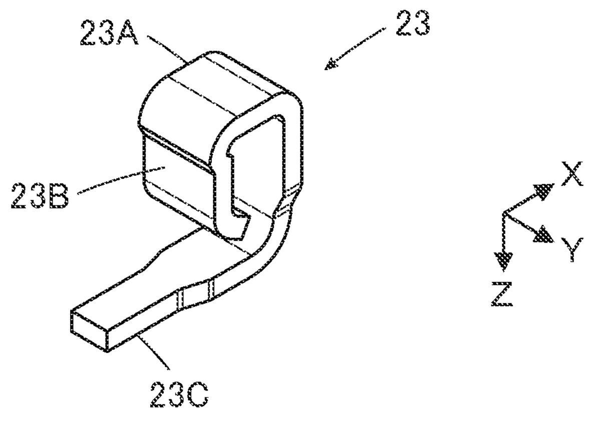
FIG. 12 is a perspective view showing a counter contact used in the counter connector.

FIG. 12 shows a contact 23 disposed on the −X direction side, of the plurality of contacts 23 arrayed in two lines along the Y direction. The contact 23 is formed of a single bent metal sheet and includes a bent portion 23A bent in a U-shape opening in the +Z direction, and an outer surface of the bent portion 23A forms a contact point 23B. In addition, a +Z directional end portion of the bent portion 23A is bent and extends in the −X direction, and this extending portion is provided with a mounting portion 23C facing in the +Z direction.

Of the plurality of contacts 23 arrayed in two lines, contacts 23 situated on the +X direction side are arranged symmetrically to contacts 23 on the −X direction side about a YZ plane, but each have the same configuration as that of the contacts 23 on the −X direction side.

Figure 13:
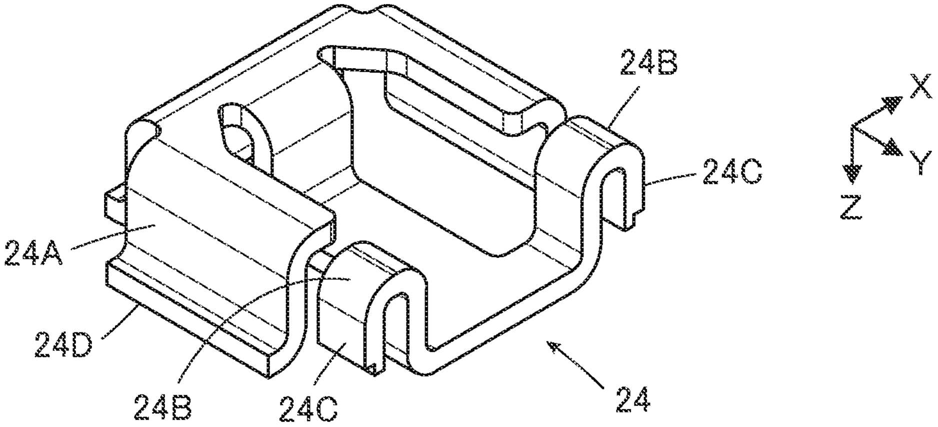
FIG. 13 is a perspective view showing a counter reinforcing member used in the counter connector.

FIG. 13 shows a reinforcing member 24 disposed on a −Y directional end portion of the housing 22, of the pair of reinforcing members 24. The reinforcing member 24 is formed of a single bent metal sheet and includes a reinforcing portion 24A extending in a U-shape along the −Y directional end portion of the housing 22, and a pair of connecting portions 24B connected to the reinforcing portion 24A and disposed to be adjacent to each other on the +Y direction side of the reinforcing member 24. The pair of connecting portions 24B are situated at the same Y directional position and each have a bent portion bent in a U-shape opening in the +Z direction, and an outer surface of the bent portion forms a contact point 24C. In addition, a mounting portion 24D is formed at a +Z directional end portion of the reinforcing portion 24A.

As with the connector 11, the pair of reinforcing members 24 and the housing 22 are integrally molded, and then the plurality of contacts 23 are separately press-fitted into the plurality of contact accommodating grooves 22B formed in the outer wall portion 22A of the housing 22, whereby the counter connector 21 shown in FIG. 10 is produced. Note that the plurality of contacts 23 may be held, in the housing 22, integrally with the pair of the reinforcing members 24 by insert molding.

For example, the counter connector 21 is disposed on a second substrate (not shown), the mounting portions 23C of the plurality of contacts 23 are separately solder-mounted on a plurality of connection pads of the second substrate, and the mounting portions 24D of the pair of reinforcing members 24 are solder-mounted on a power source pad of the second substrate, whereby the counter connector 21 can be mounted on the second substrate.

Figure 14:
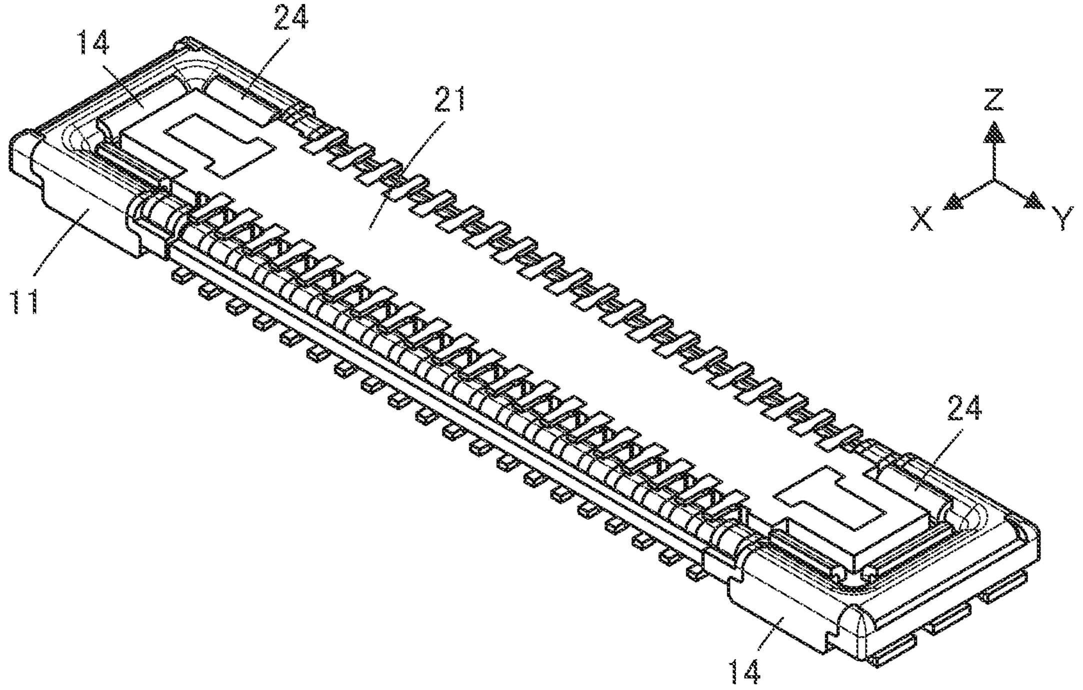
FIG. 14 is a perspective view showing the connector of the embodiment in a fitting state with the counter connector.

The counter connector 21 situated on the +Z direction side of the connector 11 is moved in the −Z direction and pressed against the connector 11, whereby the counter connector 21 is fitted with the connector 11 as shown in FIG. 14. Note that the counter connector 21 is fitted in such a position that the outer wall portion 22A of the housing 22 projects toward the connector 11.

When the counter connector 21 is fitted with the connector 11, each of the pair of reinforcing members 24 of the counter connector 21 is fitted to the inside of the corresponding one of the pair of reinforcing members 14 of the connector 11, and the presence of these reinforcing members 14 and 24 allows to reinforce opposite end portions, in the Y direction, of each of the connector 11 and the counter connector 21, the Y direction being the longitudinal direction of the connector 11 and the counter connector 21. Therefore, even when the counter connector 21 is fitted to the connector 11 from an oblique direction with respect to the Z direction for example so that an external force acts at the opposite end portions, in the Y direction, of each of the connector 11 and the counter connector 21, the connector 11 and the counter connector 21 can be fitted with each other without being damaged.

When the counter connector 21 is fitted with the connector 11, the fitting portion 12B of substantially cuboid shape of the housing 12 of the connector 11 shown in FIG. 2 is fitted to the inside of the outer wall portion 22A of frame shape of the housing 22 of the counter connector 21 shown in FIG. 11. At this time, since the rib portion 16K of the second member 16, shown in FIGS. 7 and 8, of the connector 11 is embedded in the fitting portion 12B of the housing 12 to reinforce the fitting portion 12B, even when the counter connector 21 is excessively pressed against the connector 11, the plurality of contacts 13 of the connector 11, the plurality of contacts 23 of the counter connector 21, and other components are prevented from being damaged.

Figure 15:
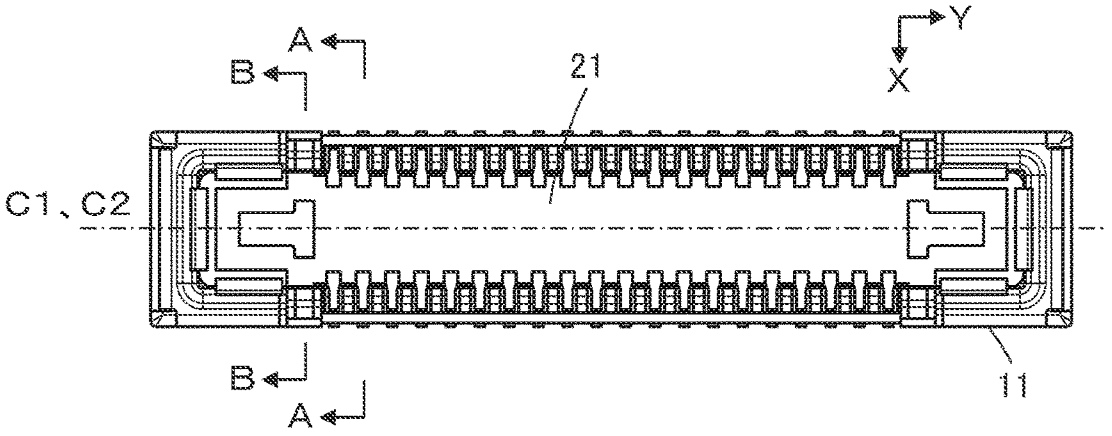
FIG. 15 is a plan view showing the connector of the embodiment in the fitting state with the counter connector.

The connector 11 and the counter connector 21 are fitted with each other such that the central axes C1 and C2 overlap each other when viewed in the Z direction as shown in FIG. 15.

At this time, the outer wall portion 22A of frame shape of the housing 22 of the counter connector 21 shown in FIG. 11 is accommodated in the counter connector accommodating portion R of recess shape formed around the fitting portion 12B of the housing 12 of the connector 11 shown in FIG. 1.

Figure 16:
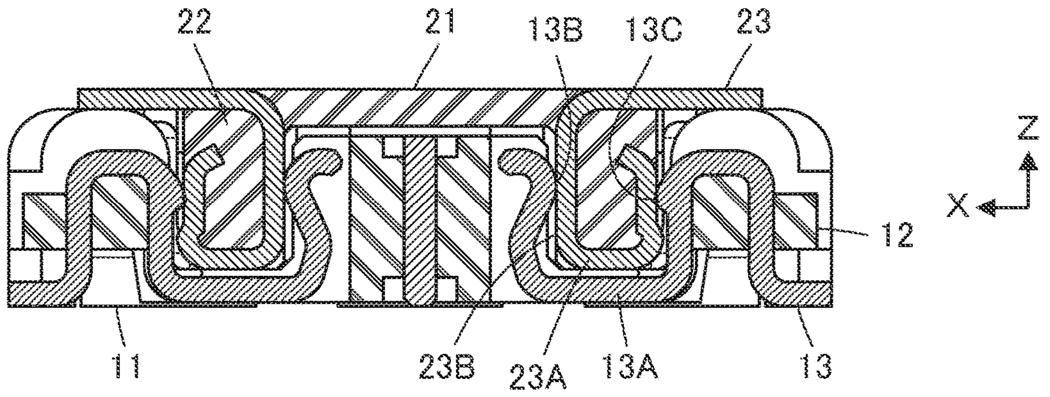
FIG. 16 is a cross-sectional view taken along line A-A in FIG. 15.

Therefore, as shown in FIG. 16, the bent portion 23A of the contact 23 of the counter connector 21 is inserted into the arm portion 13A of U-shape of the corresponding contact 13 of the connector 11 while elastically deforming the arm portion 13A. Consequently, the contact point 23B of the contact 23 is sandwiched between the pair of spring contact points 13B and 13C of the contact 13 and contacts these spring contact points 13B and 13C. In this manner, the plurality of contacts 13 of the connector 11 and the plurality of contacts 23 of the counter connector 21 are electrically connected to each other.

Figure 17:
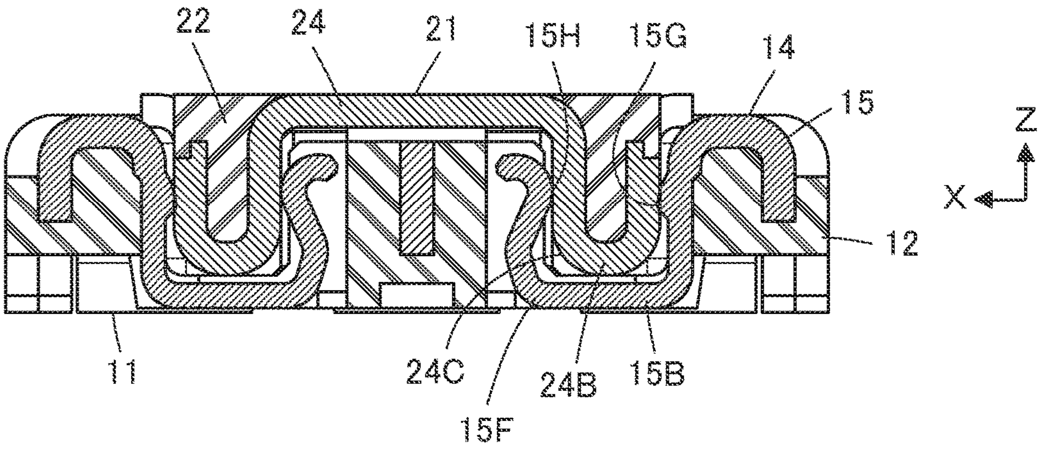
FIG. 17 is a cross-sectional view taken along line B-B in FIG. 15.
Figure 18:
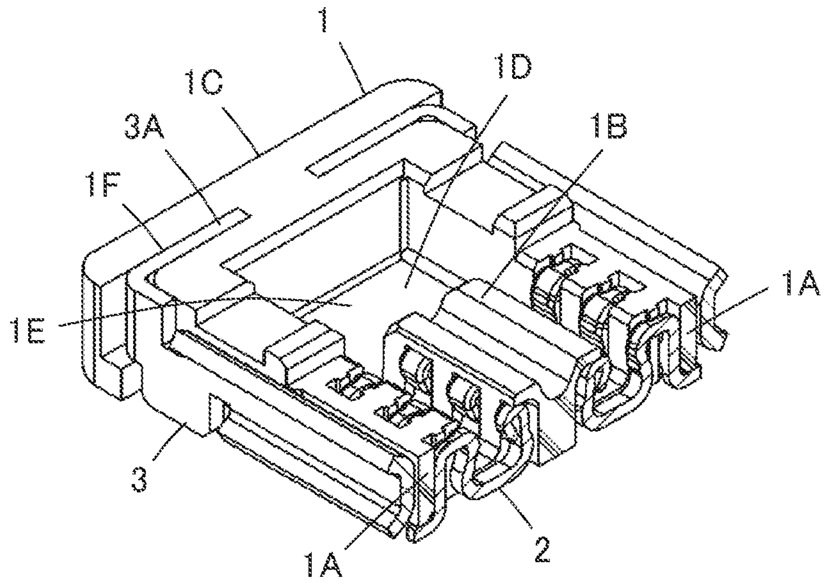
FIG. 18 PRIOR ART
FIG. 18 is a partial perspective view showing a conventional connector.

Further, as shown in FIG. 17, the connecting portion 24B of the reinforcing member 24 of the counter connector 21 is inserted into the arm portion 15F bent in a U-shape of the connecting portion 15B of the first member 15 included in the reinforcing member 14 of the connector 11 while elastically deforming the arm portion 15F. Consequently, the contact point 24C of the connecting portion 24B of the counter connector 21 is sandwiched between the pair of spring contact points 15G and 15H of the connecting portion 15B of the connector 11 and contacts these spring contact points 15G and 15H. In this manner, the first member 15 of the connector 11 and the reinforcing member 24 of the counter connector 21 are electrically connected to each other.

At this time, since a plurality of contact points including the spring contact points 15G and 15H of the connecting portion 15B of the first member 15 of the connector 11 contact the contact point 24C of the counter connector 21, electrical connection between the first member 15 of the connector 11 and the reinforcing member 24 of the counter connector 21 has excellent reliability.

Since the reinforcing member 14 of the connector 11 is constituted of two components, i.e., the first member 15 and the second member 16, the pair of spring contact points 15G and 15H can be formed with a small bending radius in the connecting portion 15B of the first member 15, and the connecting portion 15B with a structure having a plurality of contact points can be realized without increasing the size of the reinforcing member 14.

As described above, since the plurality of mounting portions 15E of the first member 15 and the plurality of mounting portions 16G of the second member 16 of the reinforcing member 14 of the connector 11 are mounted on the common power source pad of the first substrate so that the first member 15 and the second member 16 constituting the reinforcing member 14 are electrically connected to each other via the common power source pad of the first substrate, the reinforcing member 24 of the counter connector 21 is electrically connected to the reinforcing member 14 of the connector 11.

Note that by mounting the connector 11 on the first substrate and the counter connector 21 on the second substrate, the connector 11 and the counter connector 21 can be used as a so-called substrate-to-substrate connector.

In addition, as with the reinforcing member 14 of the connector 11, when the reinforcing member 24 of the counter connector 21 is formed of two components, i.e., a first member and a second member, also for the reinforcing member 24 of the counter connector 21, the reinforcement strength can be ensured without increasing the bending radius.

What is claimed is:

1. A connector fitted to a counter connector along a fitting direction, the connector comprising:

a housing extending in a predetermined direction intersecting the fitting direction;

a plurality of contacts held by the housing and arrayed along the predetermined direction; and a reinforcing member held at an end portion of the housing in the predetermined direction and made of a metal material, wherein the reinforcing member includes:

a first member including a first reinforcing portion extending in a U-shape along the end portion of the housing when viewed in the fitting direction, and a connecting portion connected to the first reinforcing portion and electrically connected to a counter reinforcing member of the counter connector in fitting with the counter connector, and a second member formed as a separate component from the first member and including a second reinforcing member extending in a U-shape along the first reinforcing portion when viewed in the fitting direction.

2. The connector according to claim 1, wherein each of the first reinforcing portion and the second reinforcing portion is formed of a metal sheet of band shape having a thickness direction intersecting the fitting direction and a width direction along the fitting direction.

3. The connector according to claim 2, wherein the second member includes a cover portion joined to one end portion of the second reinforcing portion along the fitting direction and having a cross-sectional shape curved so as to cover one end portion of the first reinforcing portion along the fitting direction.

4. The connector according to claim 3, wherein the first member includes a first mounting portion formed at another end portion of the first reinforcing portion along the fitting direction, and wherein the second member includes a second mounting portion formed at another end portion of the second reinforcing portion along the fitting direction.

5. The connector according to claim 1, wherein the connecting portion is disposed to be aligned with the plurality of contacts along the predetermined direction.

6. The connector according to claim 1, wherein the first member includes a pair of the connecting portions separately connected to opposite ends of the first reinforcing portion extending in the U-shape.

7. The connector according to claim 1, wherein the connecting portion has a pair of spring contact points sandwiching a connecting portion of the counter reinforcing member from both sides of the connecting portion of the counter reinforcing member in fitting with the counter connector.

8. The connector according to claim 1, further comprising a pair of the reinforcing members separately held at opposite end portions of the housing in the predetermined direction.

9. The connector according to claim 1, wherein the plurality of contacts are arrayed in two lines along the predetermined direction.

* * * * *